(12) United States Patent
Wen et al.

(10) Patent No.: US 7,181,492 B2
(45) Date of Patent: Feb. 20, 2007

(54) TRANSFER OF AN INTERNET CHAT SESSION BETWEEN SERVERS

(75) Inventors: Sam Wen, Stony Brook, NY (US); Bradley S. Birnbaum, Muttontown, NY (US); Charles L. Warner, II, Decatur, GA (US)

(73) Assignee: Concerto Software, Inc., Westford, MA (US)

( * ) Notice: Subject to any disclaimer, the term of this patent is extended or adjusted under 35 U.S.C. 154(b) by 785 days.

(21) Appl. No.: 09/981,317

(22) Filed: Oct. 16, 2001
(Under 37 CFR 1.47)

(65) Prior Publication Data
US 2002/0161896 A1    Oct. 31, 2002

Related U.S. Application Data

(60) Provisional application No. 60/241,050, filed on Oct. 17, 2000.

(51) Int. Cl.
*G06F 13/00*    (2006.01)
(52) U.S. Cl. .................................................... 709/204
(58) Field of Classification Search ........... 379/265.13, 379/265.09
See application file for complete search history.

(56) References Cited

U.S. PATENT DOCUMENTS

| | | | |
|---|---|---|---|
| 5,555,179 A | 9/1996 | Koyama | 700/95 |
| 5,557,668 A | 9/1996 | Brady | |
| 5,765,033 A | 6/1998 | Miloslavsky | 709/206 |
| 5,926,539 A | 7/1999 | Shtivelman | 379/266.01 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 6,002,760 A | 12/1999 | Gisby | 379/266.01 |
| 6,021,428 A | 2/2000 | Miloslavsky | 709/206 |
| 6,044,145 A | 3/2000 | Kelly et al. | 379/265.02 |

(Continued)

FOREIGN PATENT DOCUMENTS

| | | |
|---|---|---|
| WO | WO99/49669 | 9/1999 |
| WO | WO00/41382 | 7/2000 |
| WO | PCT/US01/32249 | 10/2002 |

OTHER PUBLICATIONS

Hal Berghel & Douglas Blank, The World Wide Web, ACM Webpage online, XP002215559, URL:http://www.acm.org/{hlb/publications/web99/web99.html#Dynamic Web Technologies.

(Continued)

*Primary Examiner*—Robert B. Harrell
(74) *Attorney, Agent, or Firm*—Bourque and Associates

(57) ABSTRACT

A customer is transferred from a first Internet chat session on a first server to a second Internet chat session on a second server without the customer having to take any action whatsoever. The second server may be the same server as the first server or may be different from the first server and may be physically located in another city, state, country, or continent. When the need arises to transfer a customer chat to another agent (who may be on another server) the agent requests a transfer and a list of available chat sessions is provided (300) to the agent. If the agent requests a transfer of the customer to one of those available chat sessions then a determination (310) is made as to whether the proposed transfer is permitted. If the transfer is permitted and initiated by the agent, the agent's computer sends all the transfer information as well as a transfer command to the customers browser. The command sent activates a mini-application residing on the customer's browser that seamlessly connects the customer to a new URL for a second chat session. Further, when the transfer is initiated, all or a portion of the information, including documentation, from the first chat session is simultaneously transferred to the second chat session.

11 Claims, 8 Drawing Sheets

U.S. PATENT DOCUMENTS

| | | | | |
|---|---|---|---|---|
| 6,044,368 | A | 3/2000 | Powers | 707/2 |
| 6,067,357 | A | 5/2000 | Kishinsky et al. | 379/265.02 |
| 6,108,711 | A | 8/2000 | Beck et al. | 709/242 |
| 6,138,139 | A | 10/2000 | Beck et al. | 709/202 |
| 6,167,395 | A | 12/2000 | Beck et al. | 707/3 |
| 6,170,011 | B1 | 1/2001 | Macleod Beck et al. | 709/224 |
| 6,175,563 | B1 | 1/2001 | Miloslavsky | 370/352 |
| 6,175,564 | B1 | 1/2001 | Miloslavsky | 370/352 |
| 6,185,292 | B1 | 2/2001 | Miloslavsky | 379/265.01 |
| 6,185,586 | B1* | 2/2001 | Judson | 715/513 |
| 6,215,865 | B1* | 4/2001 | McCalmont | 379/212.01 |
| 6,345,305 | B1 | 2/2002 | Beck et al. | 709/242 |
| 6,373,836 | B1 | 4/2002 | Deryugin et al. | 370/352 |
| 6,389,007 | B1 | 5/2002 | Shenkman et al. | 370/352 |
| 6,393,015 | B1 | 5/2002 | Shtivelman | 370/352 |
| 6,404,884 | B1* | 6/2002 | Marwell et al. | 379/265.13 |
| 6,732,156 | B2 | 5/2004 | Miloslavsky | 709/206 |
| 6,771,766 | B1* | 8/2004 | Shafiee et al. | 379/265.09 |
| 2001/0054064 | A1* | 12/2001 | Kannan | 709/203 |

OTHER PUBLICATIONS

P. Wayner, Novera Composes Epic for Java, Byte, McGraw-Hill, Inc., Jul. 1, 1997, XP002080613, vol. 22, No. 7.

AliveChat, Custom Web-Based Call Centers, E-CRM Guide online, XP002215560, URL:http://products.ecommerce-guide.com/e-business/customer_relationship_management/965345691.html, Aug. 10, 2000, p. 1.

Alivechate Pro, WEBSITEALIVE online, XP002215561, URL:http://web.archive.org/web/20000819080832/http://www.websitealive.com/pro.htm, Aug. 19, 2000.

* cited by examiner

TRANSFER OF AN INTERNET CHAT SESSION BETWEEN SERVERS

PRIORITY CLAIM

This patent application claims the priority of provisional patent application No. 60/241,050 filed Oct. 17, 2000.

TECHNICAL FIELD

The present invention is related to Internet chat sessions and, more particularly, to the automatic transfer of a person on an Internet chat session from one server to another server.

BACKGROUND OF THE INVENTION

Internet chat sessions, although frequently regarded as a simple social communications device, have a significant business purpose as well. These sessions allow a person, such as a customer or a potential customer, to conduct, via the Internet, a communication with a company representative (referred to below as an "agent" for brevity) so as to obtain information on a product or service, repair or replacement of a product, technical or other problems or difficulties with a product, etc. The use of the Internet allows the customer and the agent to communicate one-on-one in real time and even to exchange electronic media, such as documents, photographs, sound clips, etc., in order to assist the customer in making an informed decision or aid the customer in resolving a problem. Direct communications between the agent and the customer have been done in the past by telephone, but the parties frequently could not exchange documents while communicating with each, and the company had to bear the expense of telephone lines for that purpose. At times, many of the telephone lines were not used and so the expense was wasted, and at other times the number of lines was woefully inadequate for the volume of calls. A substantial part of this expense is, therefore, avoided when the customer and the company communicate via an Internet chat session. Further, Internet chats are more efficient in that one agent may handle multiple chats simultaneously whereas a telephone conversation requires all the agent's attention.

Problems arise when the agent finds that another agent is better suited to answer the question posed by the customer, or the customer has a question that is best handled by another company, such as an associated manufacturing company, or a partner, parent, or sibling company. At present, the agent can only tell the customer of the new URL that the customer must go to. In this case, the customer must type in the URL, or cut and paste the URL, or, at best, the message from the agent will have a hyperlink to the URL so that the customer can simply double-click on the hyperlink and be connected to the URL.

However, all of these methods require some action or actions on the part of the customer, and none of these methods conveys any information to the new agent. Thus, all of the past information is lost and the customer must begin again by describing the problem or the product involved.

Further, there are times when the server designated to handle the chat sessions may become overloaded or slow down due to the number of chat sessions or to due to other procedures which the server may have to perform. However, there is no provision for redirecting existing or potentially new chat sessions to another server.

SUMMARY OF THE INVENTION

The present invention provides for downloading a mini-application, such as an executable code module, to the customer's computer so that the customer's computer, such as a PC, automatically establishes a new chat session at a new URL specified by the agent. Thus, the customer is required to take no action and is automatically transported to another chat session where the customer can obtain the information or relief desired.

The present invention further provides for transferring the contents of the current chat session from a first server to a second server, so that the agent at the second server has the full information and context from the first chat session. Thus, the customer does not have to begin anew by again describing the problem or the product involved.

The present invention further provides for a negotiation between the server handling the first chat session and the server proposed for handling the second chat session so that the server proposed for handling the second chat session is not handed chat sessions from parties who are not authorized to do so.

The present invention further provides a first server, which is heavily burdened, the ability to transfer an existing chat session or an incoming chat session request to a second server.

DETAILED DESCRIPTION

Figure 1:
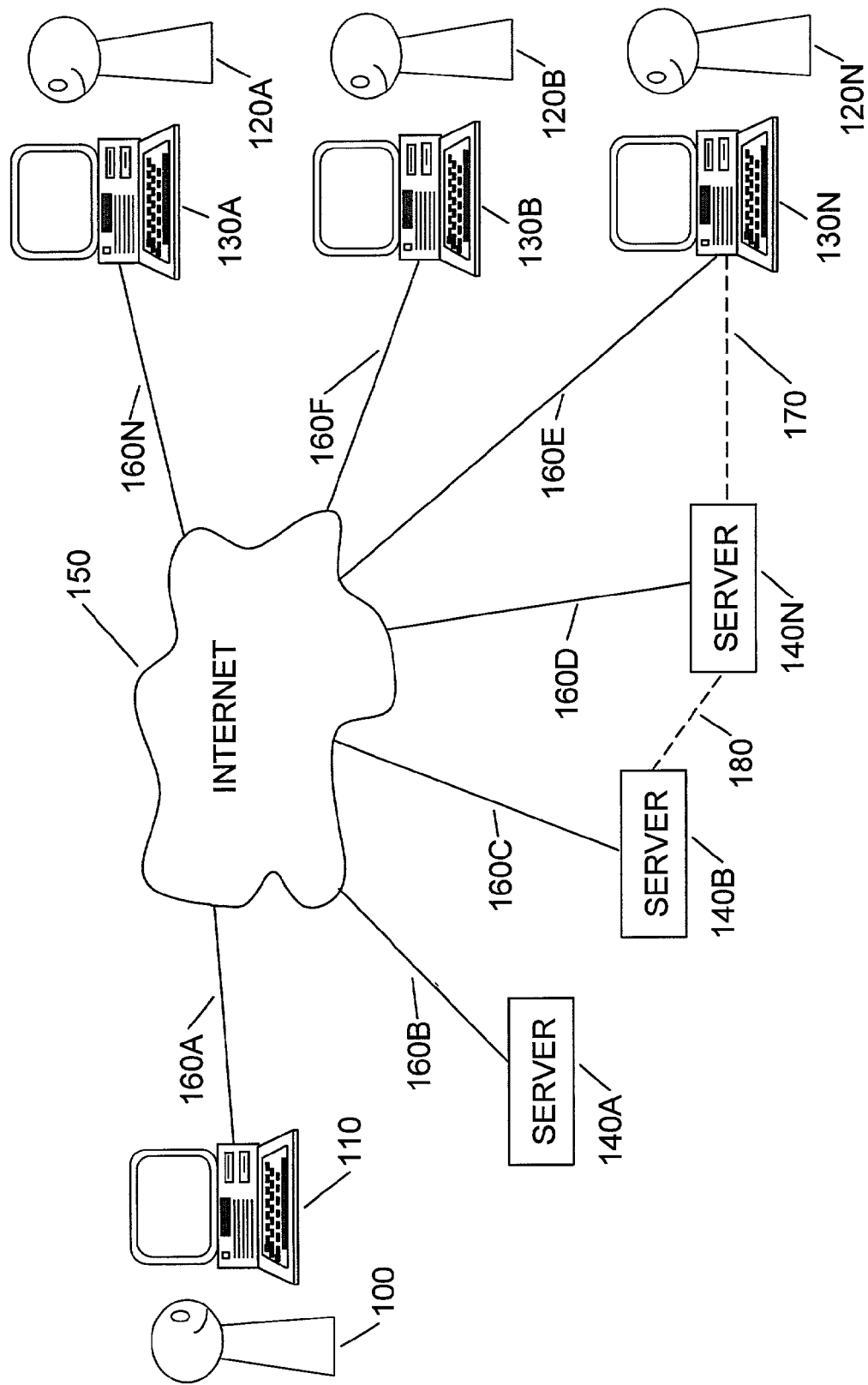
FIG. 1 is an illustration of a typical environment of the present invention.

FIG. 1 is an illustration of a typical environment of the present invention showing a customer 100 having a computer terminal 110, agents 120A, 120B, 120N having computer terminals 130A, 130B, 130N, respectively, and company servers 140A, 140B, 140N. Typically, the computer terminal 110 of a customer will be a personal computer (PC). A computer terminal 130 of an agent may be a smart terminal or a dumb terminal, depending upon the configuration of the server 140 and the terminals 130. However, for convenience and brevity, and not by way of limitation, the computer terminals 110 and 130 will be referred to as PCs The various PCs and servers are preferably connected via connections 160A, 160B, 160C, 160D, 160E, 160F, and 160N to the Internet 150. However, it will be appreciated that the PC 130 of an agent 120 may be directly connected to a server 140, such as is shown by connection 170 connecting PC 130N to server 140N. Furthermore, it will also be appreciated that the a server may be directly connected to one or more other servers, such as is shown by connection 180 connecting server 140B to server 140N. Therefore, other than the customer's PC 110 being connected to a server 140N through the Internet 150, the various connections among and between the servers 140 and the PCs 120 may be via the Internet 150 or via any other convenient method. For brevity, the discussion below presumes that all communications are via the Internet 150.

A customer 100 wishes to conduct a communication with an agent 120 for a variety of reasons, such as to obtain information about or to purchase a product or service, inquire about upgrades to a product, register the purchase of a product or service, report a problem, schedule a repair, etc. The customer 100 will then use PC 110 to access the server, for example 140A, of the company and log into a one-to-one Internet chat session with an agent, for example, 120A. When the customer 100 logs into the chat session on the server 140A, the server 140A sends a mini-application, such as an executable code module, to the PC 110 of the customer 100. This mini-application instates itself onto the customer's Internet browser program, and then a chat window or frame appears on the screen of the customer's PC. The customer then shows up in a service queue (also known as a service line) until an agent becomes available. When an agent becomes available the customer will show up on the agent's screen in the service queue. The agent then selects (picks-up) the customer and the chat session begins.

Once the customer 100 is connected to the agent 120A, the customer 100 explains the reason for the communication. The agent 120A may be able to handle the communication, or may simply be the gateway, or may not be able to assist the customer 100. In the later two cases, the agent 120A may deem it necessary that the customer 100 communicate with a different agent, for example, 120B, or even with an agent of another company, for example agent 120N. The agent 120A will then determine to what server 140 or chat session within a server that the customer 100 should be transferred. Preferably, the agent will also advise the customer that the transfer will occur and obtain the customer's consent. The agent will then cause the PC 130A to send the destination URL and a warm transfer ID number or code (WTID) for that server or chat session to the PC 110 of the customer 100.

The mini-application mentioned above, upon receiving the destination URL and the WTID, causes the Internet browser program of the PC to reload or update, and therefore go to that new destination URL. That new destination URL may be for a chat session with agent 120B, may be for a chat session with the agent 120N of a completely different company, may be the destination URL for an introductory chat session, or may be a service queue for that different company or server. The mini-application then causes a log-in to the transferred URL, and then sends the WTID as an identification number to the transferred URL.

For example, the customer 100 may start out with general question about the PC 110 that the customer purchased from the company A, and these questions may be answered by the agent 120A. However, the customer 100 then proceeds to ask more technical questions about the hardware, so the agent 120A determines the proper agent 120B to answer the questions, and the PC 130A then sends the destination URL for a chat session with agent 120B to the PC 110, and the PC 110 then uses that destination URL to begin a new chat session with agent 120B. The customer 100 then asks a question about the operating system software, which is provided by another company B. The agent 120B then determines the proper chat session for company B, the PC 130B then sends the destination URL for a new chat session with an agent 120N for company B, and the PC 110 then uses that destination URL to begin a new chat session with agent 120N for company B.

Therefore, the customer 100 has been transferred, without any effort or action by the customer 100, to chat sessions with the various agents 120 who are able to assist the customer.

However, it is also desirable that the customer not have to re-enter information on each transfer. Therefore, in one embodiment, at each transfer, all of the correspondence and information from the present chat session is forwarded to the new chat session.

In another embodiment, the agent has the option of causing all, some, or none of the information from the present chat session to be forwarded to the new chat session. This is advantageous when the customer may have provided certain personal information, such as an account number or credit card number, which was needed for the first chat session, but there may not be a need for that information in the new chat session. For example, where the customer has provided a credit card number to purchase a product or service or upgrade in the first chat session, and where the chat session is to be transferred to the agent of another, unrelated company.

In still another embodiment, none of the correspondence and information from the present chat session is forwarded to the new chat session.

In still another embodiment, the determination of whether all of the correspondence and information is to be transferred, whether the agent has the option to transfer all, some or none of the correspondence and information, or whether none of the correspondence and information is to be transferred, may be based upon to where the customer is to be transferred. For example, if the chat session is to be transferred to another agent in the same department, such as a supervisor, then all of the correspondence and information may be automatically transferred. However, if the chat session is to be transferred to another agent in the same company, then the agent on the present chat session may have the option of what is to be transferred. Further, if the chat session is to be transferred to an agent of another company, then none of the correspondence and information will be transferred.

Figure 6A:
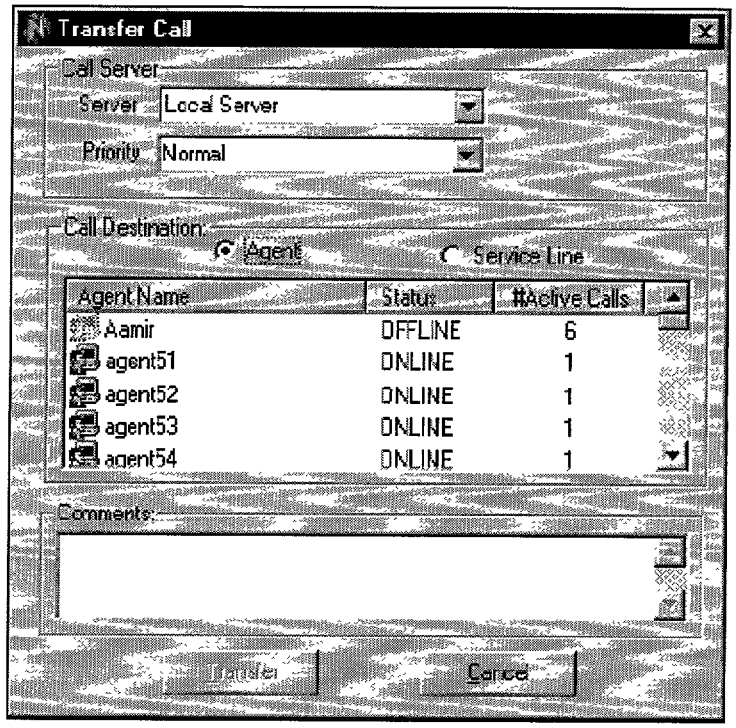
FIGS. 6A and 6B are an illustration of the transfer screen that an agent sees in the preferred embodiment of the present invention.
Figure 6B:
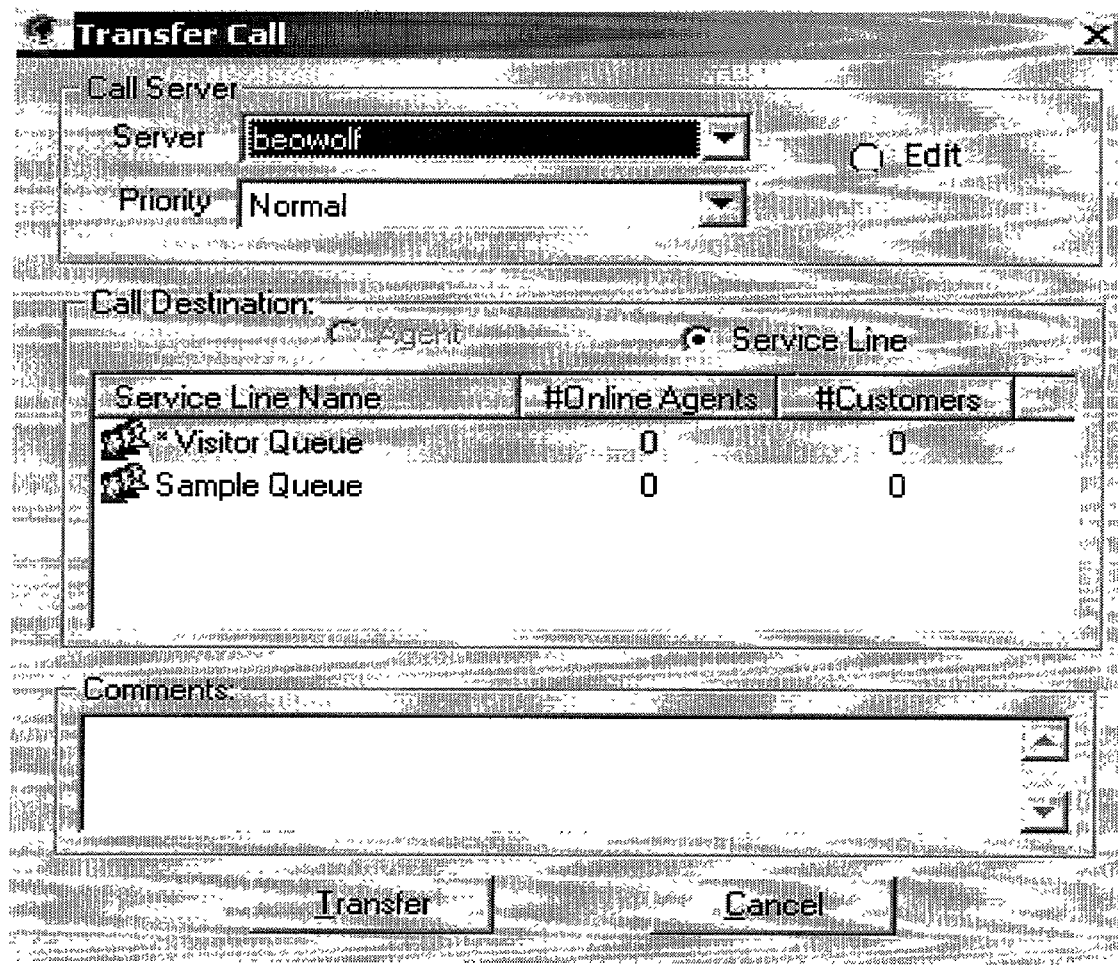

Other tests and controls for determining whether all, an optional amount, or none of the correspondence and information are to be transferred may be devised based upon the particular needs and business of the company. When agent 120A determines that the customer and the chat session should be transferred, the agent 120A will press a key, or click on a pull down menu, which causes a window to appear for the option of transferring the chat session. This window lists the choices available, such as other departments or agents of the same company, and other companies. Examples of screens seen by an agent wanting to transfer a customer are shown in FIGS. 6A and 6B.

First consider the situation where the chat session is to be transferred to another agent on the same server, such as a person within the same company. The server, for example, server 140A, will assign a destination URL and a WTID for a new chat session, and then send that destination URL and WTID to the agent 120A. The agent 120A will then send this destination URL and WTID to the customer's PC 110, and will send the chat session information and documents (if appropriate and permitted) to the server 140A at that destination URL. When the customer's computer 110 receives the destination URL and WTID, it will immediately cause the Internet browser program to load that destination URL and go to that destination URL, log-in using the WTID. It may be that all agents for that specific chat room may be busy, so the customer may receive advisory messages, commercial announcements, other options, etc. so that the customer does not feel that she/he has reached a dead-end URL. If an agent is available when the customer signs on to the destination URL, or if an agent becomes available, the server 140A has the customer 100, the new agent 120B, and any transferred documents and information. The server 140A then matches any documents and information, using the WTID, transfer these documents and information to the new agent 120B, and connects the new agent 120B to the customer 100 in the new chat session. Thus, the customer has been effortlessly transferred to a new chat session, and the new agent 120B has the information and documents from the previous chat session. Therefore, the customer has not had to re-enter any information or re-transmit any documents.

Now consider the situation where the chat session is to be transferred to an agent on a different server, such as server 140B. The agent's screen (FIG. 6B) may list specific areas for chat sessions on that server, or only list the server. When the agent selects the specific chat session area or server, as the case may be, the server 130A inspects the request to verify that the particular agent 120A and/or PC 130A are authorized to transfer a chat session. If so, then the agent's PC 130A or the first server 140A sends a request for a chat session, either a general request or a request for a specific chat session area, to the second server 140B, along with any server, agent, or company name, identification number, password, authentication code, key, etc. The server 140B inspects this information to determine whether agent 120A, PC 130A, or server 140A is authorized to transfer a chat session to server 140B.

If agent 120A, PC 130A, or server 140A is authorized to transfer a chat session to server 140B and a specific chat session area has been requested then the server 140A will determine whether that chat session area is authorized and whether that chat session area is currently available. If a specific chat session area was not requested, then the server 140B will respond with a list of the authorized and available chat session areas. The agent 120A can then select the desired chat session area from the list.

In another embodiment, the server 140B does not identify specific chat session areas or respond to a request for a specific chat session area, but simply has a single input gateway for a general introductory chat session.

Once the specific chat session area or general chat session, as appropriate, has been identified, the server 140B will send a destination URL and WTID to the PC 130A. This destination URL may be for that specific chat session or agent or may merely identify the destination server or a service queue on the destination server. For example, a specific destination URL may be "mycompany.com/software/chat/197463D", whereas a less-specific destination URL may be "mycompany.com/software/chat". The WTID identifies the particular customer.

The destination URL and the WTID may be used together, or independently. The example above is where both are used. In another embodiment, the destination URL may be so specific as to adequately identify both the customer and the documents associated with that customer, and so the WTID is not required. In still another embodiment, the URL is not very specific and merely identifies the destination server or a service queue on the destination server, and so the WTID identifies the particular customer and the documents associated with that customer. Of course, both a specifc destination URL and a WTID may be used so as to provide extra security or checking that the customer has been matched with the correct documents and information.

As mentioned above, when the PC 130A receives the destination URL and/or the WTID from the server 140B, the PC 130A will then, automatically, or at the request of the server 140A, or at the request of the server 140B, or at the request of the agent 120A, send the destination URL and/or the WTID to the customer's PC 110, and will also, if appropriate, send all or part of the current chat session information and any other documents or information to that destination URL at server 140B. Then, when the customer 100 arrives at the server 140B, the transferred information and documents, if appropriate, arrive at the server 140B, and an agent 120N becomes available at the server 140B, the server 140B will connect the customer 100 to the agent 120N and present the transferred information to the agent 120N.

Therefore, the customer has not had to re-enter any information or re-transmit any documents, even though the customer has been transferred from a chat session on a server at one company to a different chat session on a different server at a different company.

Figure 2A:
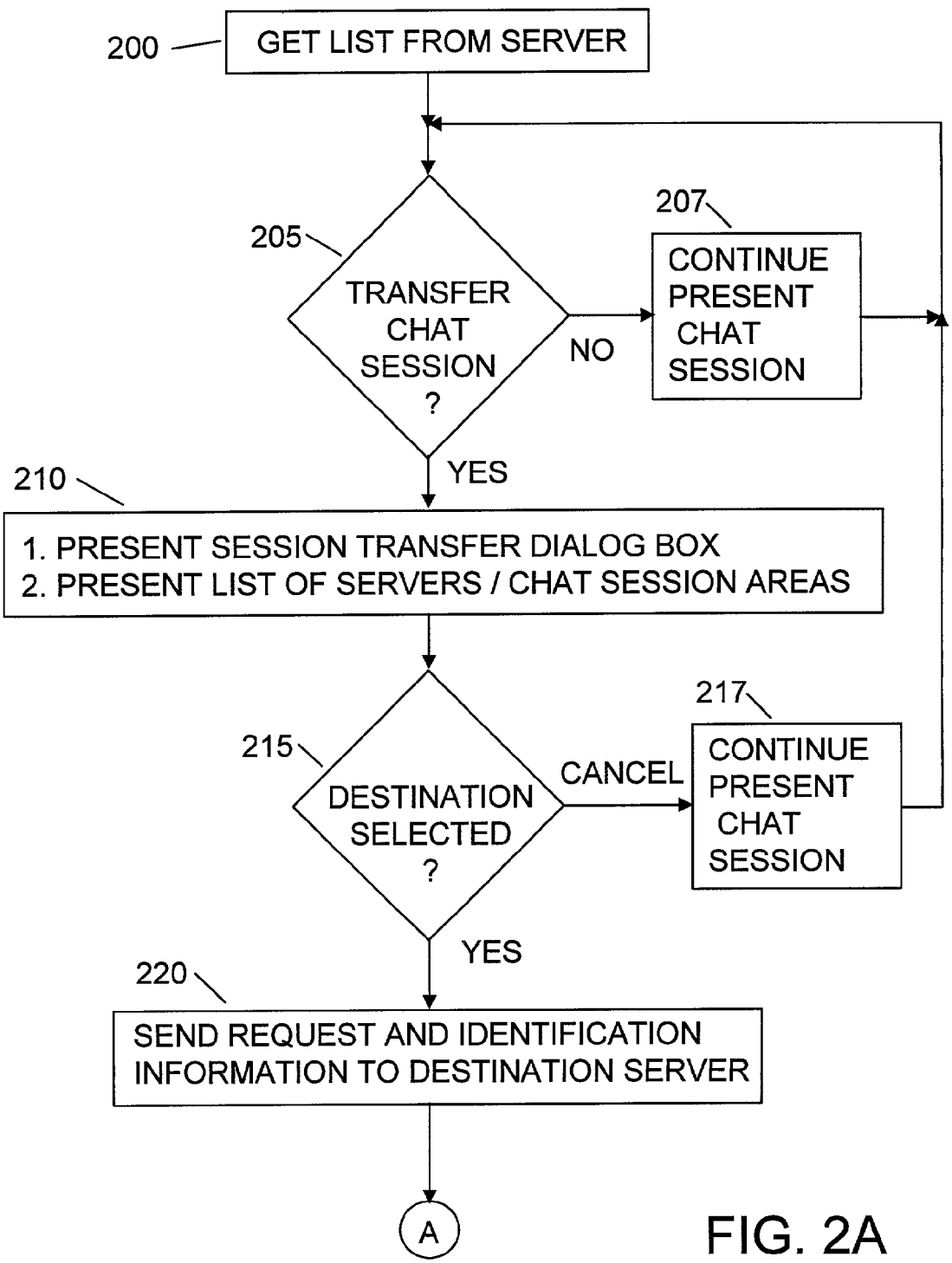
FIGS. 2A–2B are a flowchart of the operation of an agent computer terminal according to the preferred embodiment of the present invention.
Figure 2B:
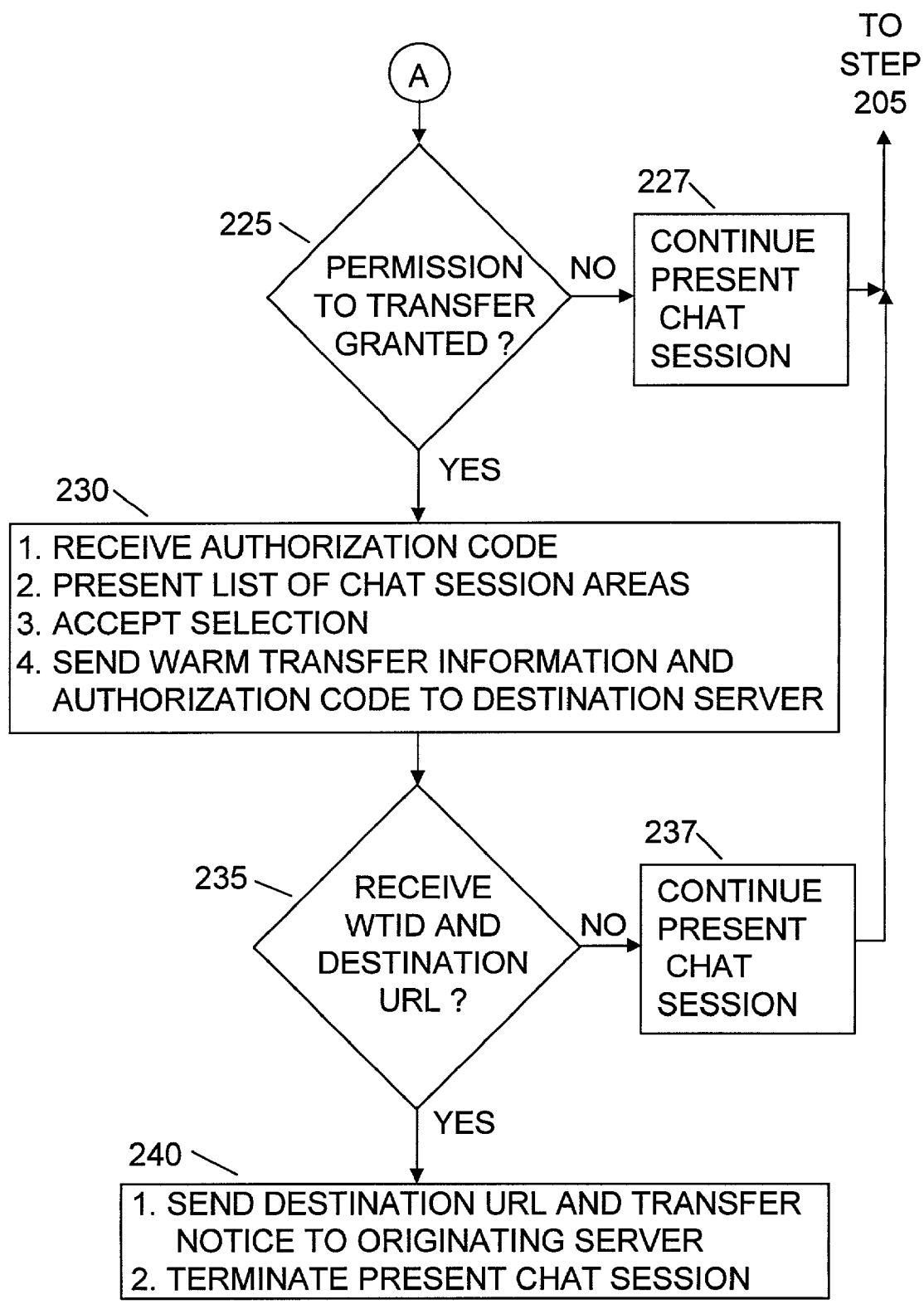

FIGS. 2A–2B are a flowchart of the operation of a PC 130, for example PC 130A, according to the preferred embodiment of the present invention. Upon start-up, or agent 120A log-in, the PC gets 200 the list of servers and/or chat areas, if available, from its designated server, such as server 140A. The list may be names, URLs, hyperlinks, a subject matter identifier identifying the subject handled by a particular server, etc., or a combination of two or more of the above as desirable to allow the agent to quickly and easily identify the best destination for the chat session. Not shown, but understood, are the steps of verifying and completing the log-in and connecting the agent 120A to a customer 100 for a chat session. At some point during the chat session the agent may determine that the customer should be transferred to a chat session with another agent. The PC monitors 205 for a request from the agent to transfer the customer to a chat session with another agent. If the agent does not make a request then the present chat session continues 207 and the PC continues to monitor 205 for a request.

If the agent makes the request then the PC presents 210 a session transfer dialogue box which has any available options for the agent, and also a list of servers and/or chat session areas if available. The FIGS. 6A and 6B are examples of a dialogue box presented to the agent. The transfer options may include whether to send all, none, or part of a chat session or a document or information obtained by the agent. However, a system rule, or a rule based upon the particular agent or the chat session or the destination server may force "all" or "none" and eliminate options for the agent with respect to the transfer of information and documents. In addition to transferring the text of the session, the agent may want to transfer particular comments to the new agents. These comments can be entered in a dialogue or comments box. Further, in the dialogue box the agent may simply cut and paste a portion of the session. The PC then monitors 215 for the selection of a destination server or a destination chat session area, if available.

If the agent cancels the request, then the present chat session continues 217 and the PC continues to monitor 205 for a request.

If the agent makes a selection of the destination then the PC sends 220 a request for permission to transfer the chat session, such as an HTTP request, and also sends an identification code or other identifying criteria to the destination server. If available chat session areas have previously been identified, such as at step 200, then the desired chat session area is also indicated. If only a server has been identified, then the request from the PC also includes a request for the identification of the chat sessions which are available from that server.

The PC then monitors 225 for permission to transfer the chat session. If permission is not granted then the present chat session continues 227.

If permission is granted then the PC will receive 230 an authorization code from the destination server. In addition, if the chat session areas were not previously available, the PC will also receive a list of available chat session areas. If not previously presented and selected, the PC will then select a chat session area designation from the agent. The PC then sends ("posts") the warm transfer information and authorization code to the destination server. The warm transfer information that the PC sends preferably includes the following: originating server name, agent name, customer name, customer email address, subject, login time, client type, transferring queue name (such as the name of the specific chat area), any priority recommendation, transfer notes, transfer transcripts, documents referenced during the present chat session, etc.

The PC then monitors 235 for acceptance by the destination server. Acceptance may be indicated in any desired manner, but should also include the WTID and the destination URL for the transfer (the transfer URL). If the destination server does not accept (refusal, or no timely response) then the transfer attempt is terminated and the present chat session continues 237.

If the destination server does accept then the PC 240 sends the destination URL and the WTID to the customer's PC and also sends a notice of the transfer and the destination URL to its own server 140A. This terminates the present chat session and frees the agent up for another chat session. Although reference is made above to the PC taking certain actions, such as sending the information and documents to the destination server, it should be appreciated that these functions may also be performed by the first server 140A.

Figure 3:
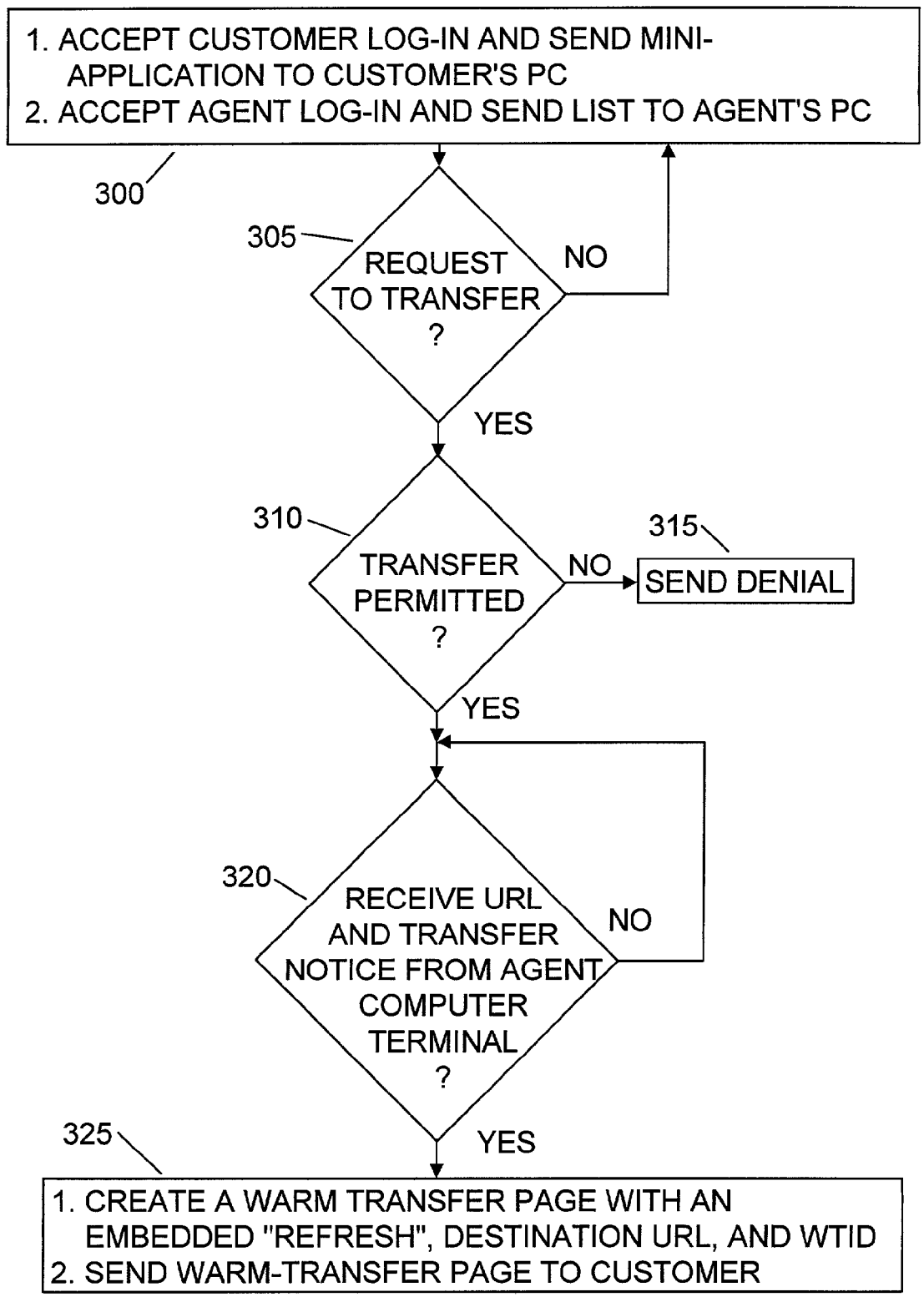
FIG. 3 is a flowchart of the operation of the originating server according to the preferred embodiment of the present invention.

FIG. 3 is a flowchart of the operation of the originating server according to the preferred embodiment of the present invention. The originating server controls log-in by the customer, sending the mini-application to the customer, controlling whether a warm transfer is permitted, and executing the rules pertaining to the transfer of documents and other information. The originating server also serves as a conduit for the agent's PC 130 although, as explained above, some of the functions described above may be performed by either the agent's PC or the originating server.

The originating server, such as 140A, accepts 300 the customer's log-in and sends the mini-application to the customer. The server also accepts the agent's log-in and then sends the list of step 200 to the agent's PC. The server then monitors 305 for a request to transfer the chat session.

If the agent has requested a transfer of the chat session the server tests 310 whether such a transfer is permitted. Permission or denial may be across the board for all agents, or may be on a selective basis, as described above. If the transfer is denied then the server sends 315 a denial of the request.

If the transfer is permitted then the server waits 320 for the transfer notice and transfer URL from the agent's PC.

Once this information is received then the server creates 325 a warm transfer page with an embedded "refresh" command, with the destination URL to be used as the refresh URL, with the WTID, and then sends this page to the customer's PC. This ends the active participation of the first agent 120A and the originating server 140A, unless the originating server 140A also happens to be the destination server for that customer, such as when an agent in a different department is involved.

The originating server also performs other duties, such as presenting prompts and any appropriate options for the agent, conducting or coordinating the transfer of the chat session information and documents between the agent's PC 130A, the originating server 140A, and the destination server 140B, etc.

Figure 4A:
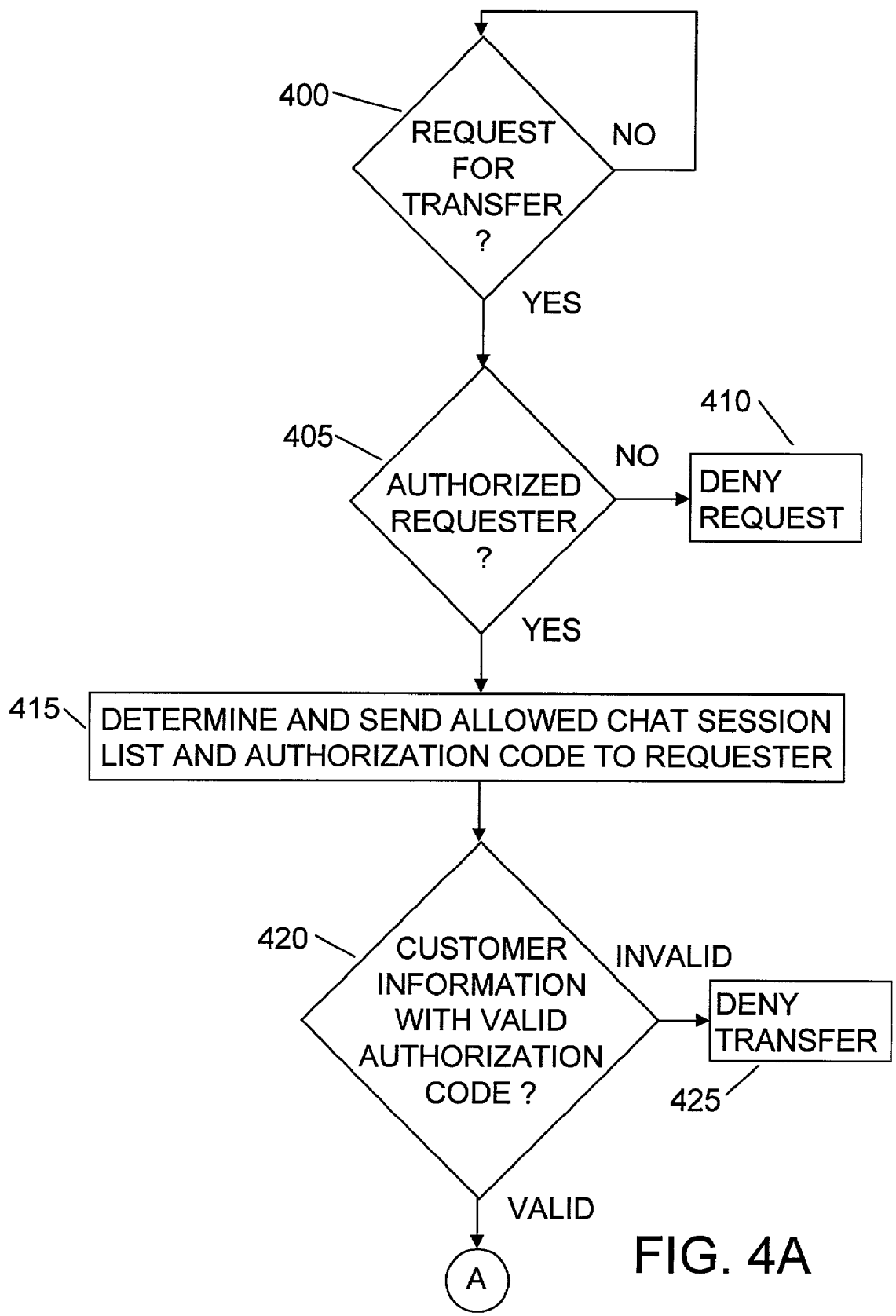
FIGS. 4A and 4B are a flowchart of the operation of the receiving server according to the preferred embodiment of the present invention.
Figure 4B:
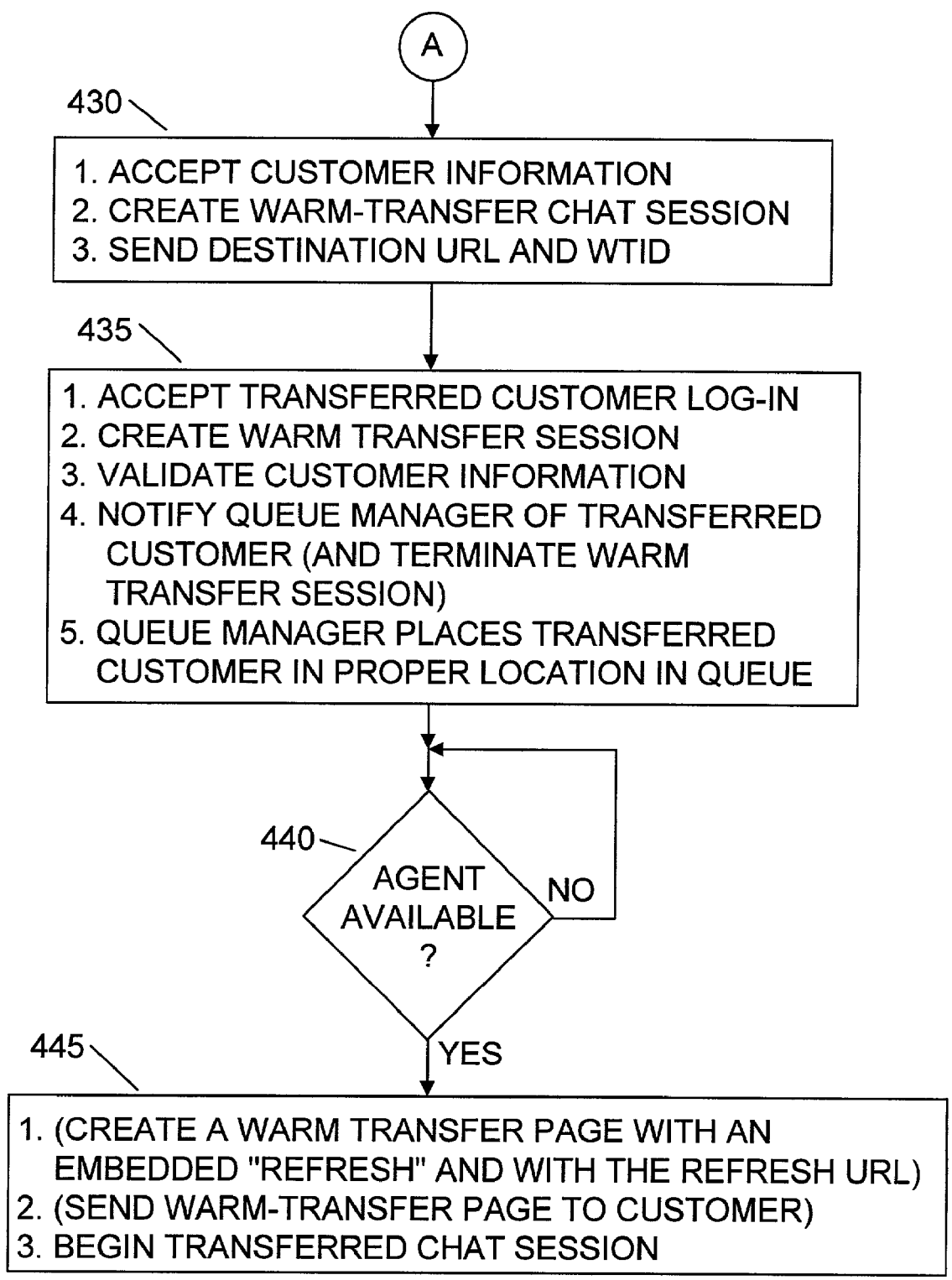

FIGS. 4A and 4B are a flowchart of the operation of the receiving server according to the preferred embodiment of the present invention. The receiving server, such as server 140B, monitors 400 for a request for a transfer. If a request is received the server checks 405 the credentials of the requester to verify that the requester is authorized to do a warm transfer. The credentials may be, for example, the name, electronic address, or other identification of the requester, the name, electronic address, or other identification of the server associated with the requester. If the requester is not authorized, the server sends 410 a denial of the warm transfer.

If the requester is authorized then the server determines 415 the allowed chat session areas or list, and sends this list, along with an authorization code, to the requester, that is, the PC 130A of the agent 120A.

The server then monitors 420 for the receipt of customer information with a valid authorization code. If the authorization code is invalid then the server denies 425 the transfer.

If the authorization code is valid then the server accepts 430 the customer information, creates a warm-transfer chat session, and then sends the destination URL and the WTID for the new chat session to the requester. The server then waits for the transferred customer log-in to the transfer URL address.

In one embodiment, when the customer logs-in, the server accepts 435 the transferred customer log-in, checks the WTID sent by the customer's PC, creates a warm transfer chat session, associates the customer information previously provided by the agent with the customer using the WTID or the destination URL, if sufficiently specific, then terminates the warm transfer session without terminating the connection with the customer, and notifies the queue manager that the transferred customer is waiting. The queue manager, which may be running on the server or running on a different computer system, then places the transferred customer in the proper location in the queue. The proper location may be based upon the time at which the transferred customer logged-in, may be based upon the time at which the server notified the queue manager, may be based upon the fact that the customer is a transferred customer, or any other desired criteria for determining the priority that is to be assigned to this customer. The server, or the queue manager if different, determines 440 when an agent is available for a chat session with the customer.

When an agent, such as agent 120N becomes available, the server creates 445 a new warm transfer page with an embedded refresh command and a destination URL corresponding to the new chat session to be started, and then sends the warm-transfer page to the customer's PC 110 to begin the transferred chat session. The server may also create a new WTID, if appropriate or desired, associates the customer information with that new WTID, and sends the new WTID, as part of the warm transfer page, along with the destination URL. Not shown, but implied, are the steps of connecting the available agent to the chat session and connecting the customer to the chat session when the customer logs-in to the new refresh URL.

When a warm transfer page is sent, or "pushed" to the customer's PC 110, it includes a command that when received causes the mini-application to execute. The mini-application can be any one of the many available forms such as a Java™ applet, an Active-X™ or HTML command, etc. The mini-application executes the command to refresh the web page on the screen of the customer's PC, but substitutes a new URL, the destination URL, as the refresh address. Thus, when the refresh command is executed, the customer is transported to the destination URL for the new chat session.

In another embodiment, when the customer logs-in, the server accepts 435 the transferred customer log-in, checks the WTID sent by the customer's PC, creates a warm transfer chat session, associates the customer information previously provided by the agent with the customer using the WTID or the destination URL, if sufficiently specific, and notifies the queue manager that the transferred customer is waiting. The customer then shows up in a service queue on the destination server until an agent becomes available. When an agent becomes available the customer will show-up on the agent's screen in the service queue. The agent then selects (picks-up) the customer, the server sends the customer's information to the agent's PC for display to the agent, and the new chat session begins. Thus, in this embodiment, the warm transfer session of step 435 is not terminated, and, in step 445, a second warm transfer page is not created and the customer is not transferred again but, instead, the agent merely joins the already existing chat session. However, again, the agent is fully informed, by the customer information and documents, of the reason that the customer is in the chat session. Thus, the present invention also contemplates a one-step warm transfer.

Figure 5:
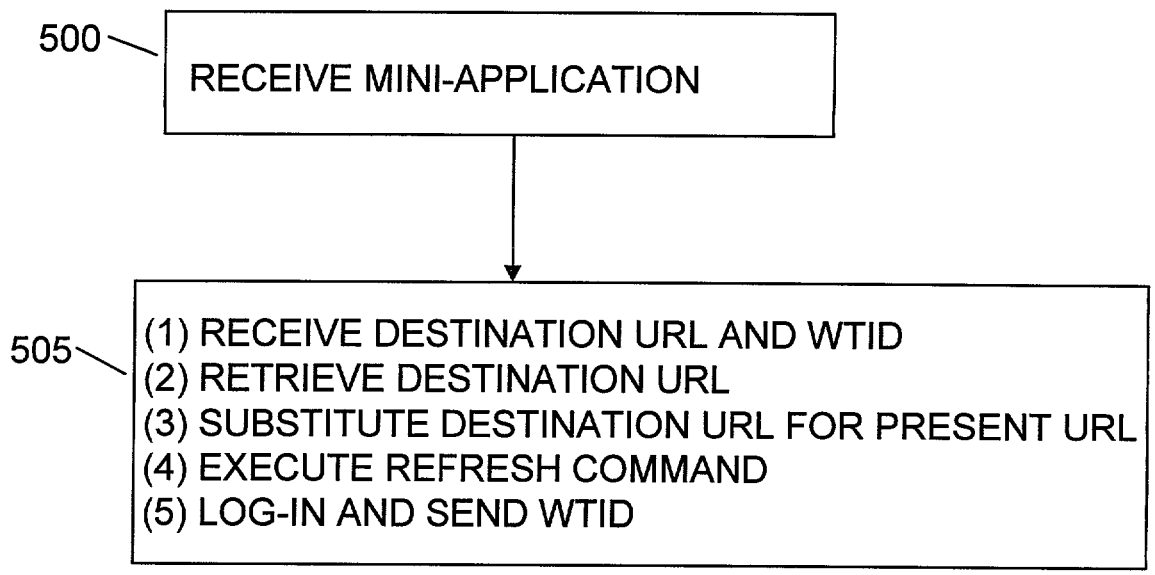
FIG. 5 is a flow chart of the operation of the customer's PC according to the preferred embodiment of the present invention.

FIG. 5 is a flow chart of the operation of the customer's PC according to the preferred embodiment of the present invention. When the customer logs-in to the originating server for a chat session, a mini application is loaded 500 onto the customers computer.

During the one-on-one Internet chat, the PC 110 receives 505 a warm transfer web page from the originating server 140A, and this web page contains the destination URL and/or the WTID. The customer's PC then retrieves the destination URL, substitutes the destination URL for present URL in the web browser program, and then causes the web browser program to execute a refresh command (sometimes called an "update" or a "reload" command). The mini-application also logs-in to the destination server, and sends the WTID, if any, to the destination server. Thus, when the refresh command it executed, it is to the destination URL, rather than to the original URL, and so the customer is transported effortlessly to the new, destination URL, without having to enter a new address, or even to log-in to the new server.

FIGS. 6A and 6B are an illustration of the transfer screen that an agent sees in the preferred embodiment of the present invention.

When an agent determines that a chat session is to be transferred, the agent clicks on or selects a "Transfer Call" button (not shown). The Transfer Call button allows the Agent to transfer a chat session to another agent, to a supervisory agent, or another server, or to send a customer back to any service queue which is currently staffed by one or more agents. The agent preferably cannot transfer a customer to a service queue which is not staffed, or transfer the customer to a specific agent who is not currently online. Furthermore, the agent preferably cannot transfer a chat session to an agent who is already handling the maximum number of allowed simultaneous chat sessions, which is six in the preferred embodiment.

Clicking on the Transfer Call button brings up the Transfer Call screen of FIG. 6A. A window shows all of the agents who are presently online. Notice the faded icon for agent Aamir, which is the Agent's login name in this example. To transfer a chat session to another agent, the agent selects the agent to whom the chat session is to be transferred. The agent can also enter text in the Comments field. The agent then clicks on the Transfer button (grayed out because a destination agent has not yet been selected in the illustration), and the chat session is transferred. The background of the window preferably provides an indication that the chat session has been transferred, such as by changing the background field from white to gray.

To transfer a call to one of the service queues the agent clicks on the button labeled "Service Line". A list of available service queues appears in the field, along with the number of agents and customers in the service queues. The agent then selects the service queue to which the chat session is to be transferred and clicks on the Transfer button (grayed out because a destination service queue has not yet been selected in the illustration), and the chat session is transferred. The background of the window preferably provides an indication that the chat session has been transferred, such as by changing the background field from white to gray.

If an agent determines that a warm transfer is desired, that is, a transfer to another server or a person on another server, the agent will click on the arrow on the right-hand side of the Server field, as shown in FIG. 6B. A list of available servers, if any, will then be presented in a drop-down menu. The agent then scrolls down to the server to which the customer is to be sent, such as the "beowolf" server, and clicks on that server. The screen then displays the possible destinations at that server, such as the "Visitor Queue" and the "Sample Queue", as shown in FIG. 6B. The agent then selects the desired destination, the Visitor Queue in this example. Depending upon the preselected options for the originating server, all, some, or none of the history of the chat session or a transcript of the chat session up to the time of transfer may be sent to the destination server. If the agent has the option of editing the history or the transcript, then a "Edit" button will appear. If the agent clicks on the button then, to the extent that the agent is allowed to edit, the history and transcript will appear as a dialogue box and the agent may edit the history and/or transcript. Once any permissible editing has been done by the agent, the agent then clicks the Transfer button (not grayed out because the destination has been selected), and the chat session is transferred. The background of the window preferably provides an indication that the chat session has been transferred, such as by changing the background field from white to gray.

It will be noted that either one or two warm transfers may occur. If there is one transfer then this transfer is from the first URL to the destination URL, where the customer is placed in a chat session until an agent joins the existing chat session. If there are two transfers then the first transfer is from the first URL to a "holding" URL where the customer waits until an agent becomes available, and the second transfer is from the holding URL to the actual chat session URL where the customer is connected to the agent. The destination URL or the holding URL may be a chat session screen or a web page, or a combination of both. The web page may offer products or services, or advise of the expected holding time, or the rank in the holding queue, or present lists of subject areas or frequently asked questions (FAQs), or present the information and/or notes, or parts thereof, from the previous chat session with agent 120A for the customer to review for accuracy, etc.

The web page of the destination or holding URL may also provides links to other web pages on the receiving server. In this case the links may be through the destination or holding URL so that the receiving server knows the current web page of the customer's PC and has ready access to cause the second transfer or to connect the agent to the chat session. Alternatively, the mini-application may also provide for sending the linked address to the server along with the destination or holding URL, or the WTID, or some other identification of the customer. Other methods of providing for the destination server to know the current web page of the customer's PC may also be used.

In another embodiment, the receiving server, at step 430, does not send the warm transfer ID unless an agent is available. In this embodiment, if at step 430 an agent is not available, then the requesting agent is sent a denial of service, preferably with an indication that the denial is due to the lack of an available agent and that the agent can attempt a transfer again later. This denial may be with, or without, a refusal to accept the customer information. Then, when an agent becomes available, step 430 is executed, but the destination URL is not to a service queue, but is directly to the URL for the new chat session with the waiting and available agent. Then, sub-steps 1, 2 and 3 of 435 and sub-step 3 of step 445 are executed.

Of course, as with contact center pacing algorithms, agent availability may be based on actual availability or predicted availability, and predicted availability may be based upon any of those factors in contact center pacing algorithms which have an analogous factor in chat session communications, for example, but not by way of limitation, the number of agents on duty, the average, peak or other chat session time, the number of customers in the holding queue or queues, etc.

Although the preferred embodiment refers to sending the mini-application at an early point in the communication, such as when the customer first logs-in to the first server, the present invention is not so limited. The mini-application may be sent at any point while the customer's PC and the server are in communication. For example, the mini-application may be sent when the customer first logs-in, or when the customer and the agent first begin communicating, or when the agent determines that the customer should be transferred, or even just before the agent terminates the communication with the customer. Similarly, when the customer is at the holding URL, the mini-application may be sent when the customer first logs in to the holding URL, or just prior to transfer to the new chat session, or at any time while the customer's PC is in communication with the destination server. Further, once loaded onto the customer's PC, the mini-application may reside thereon indefinitely or until some predetermined event occurs. Thus, the customer may be repeatedly transferred, if necessary, by sending a new destination URL, rather than sending the mini-application for each transfer. The mini-application monitors for the occurrence of a specified event and terminates itself when the event occurs. Some examples of predetermined events to automatically terminate the mini-application are: the customer takes action to log onto a new site; the customer terminates Internet activity; an elapsed time has expired; a time certain has expired; a command from a server or agent has been sent to delete the mini-application, etc.

In the preferred embodiment, secure communications are used to transfer the customer information, the transfer URL, the WTID, and other sensitive information.

The present invention is also useful for load balancing. If, for example, at step 440, an agent is not available, or most but not all of the agents are busy and a reserve capacity is desired, the receiving server may send a new web page to the customer which causes the customer to "refresh" to a backup server, or secondary server, or another server which has the agents or capability to handle the call in a more timely manner.

It will therefore be appreciated that the present invention provides for the transfer of a customer from a first chat session on a first server to a new chat session on a second server without any action whatsoever on the part of the customer, not even requiring the simple click of a mouse or a single keystroke. Further, the second server may be the same server as the first server or may be different from the first server and may be physically located in another city, state, country, or continent. In addition, the second server may be the server of an independent company. Further, all of, some of, selected parts of, or none of, the first chat session, notes, documents, correspondence, etc., may be transferred from the first chat session and server to the second chat session and server. In addition, the customer may be transferred from one chat session to another chat session until the customer has received all of the aid or information or other action that the customer desires.

Therefore, the scope of the present invention is to be limited only by the claims below.

We claim:

1. A method for facilitating a transfer of a communication between a first device of an agent and a second device of a customer, said method comprising the steps of:
   establishing a first textual communication session between the first device and the second device;
   receiving a request from the first device of said agent to transfer said second device of said customer to a second communication session wherein the second communication session involves textual communication;
   causing a warm transfer page to be created for said second communication session;
   causing said warm transfer page to be sent to said second device; and
   causing a requested connection of said second device to said warm transfer page to be accepted wherein: prior to said step of causing a warm transfer page to be created, said method further comprises the steps of: causing a determination as to whether said request is authorized; when said request is authorized, causing a list of allowed communication sessions to be determined; causing said list of allowed communication sessions and an authorization code to be provided to said first device, receiving a selection of an allowed communication session for said second communication session, and causing an identification code for said second communications session to be sent to said second device; and causing a log-in of said second device at said warm transfer page using said identification code.

2. The method of claim 1 wherein said step of causing said warm transfer page to be created comprises causing said warm transfer page to include an embedded refresh.

3. The method of claim 1 wherein said step of causing said warm transfer page to be created comprises causing said warm transfer page to include a destination address.

4. The method of claim 1 and, prior to said step of causing said requested connection to be accepted, further comprising the step of causing an application file to be sent to said second device for causing said second device to request said connection.

5. A method of facilitating a transfer of a communication between a first device of an agent and said second device of a customer, said method comprising the steps of:
   establishing a first textual communication session between the first device and the second device;
   receiving a request to transfer said second device of the customer to a second communication session wherein the second communication session involves textual communication;
   causing said second communication session to be established and
   said second device to be connected to said second communication session wherein: prior to said step of causing a second communication session to be created, said method further comprises the steps of: causing a determination as to whether said request is authorized; when said request is authorized, causing a list of allowed communication sessions to be determined; causing said list of allowed communication sessions and an authorization code to be provided to said first device, receiving a selection of an allowed communication session for said second communication session, and causing a destination address and an identification code for said second communications session to be sent to said second device; and causing a log-in of said second device at said destination address using said identification code.

6. The method of claim 5 wherein said step of causing said second device to be connected to said second communication session comprises: causing a destination address for said second communication session to be determined; and causing said second device to be directed to said destination address.

7. The method of claim 5 wherein said step of causing said second device to be connected to said second communication session comprises the steps of: causing a destination address for said second communication session to be determined; and causing an Internet browser program of said second device to be updated with said destination address.

8. A method of operating a destination device to facilitate a communication between a first device of an agent and a second device of a customer using an intermediate device, said method comprising the steps of:
   establishing a first textual communication session between the first device and the second device;
   receiving first communication session information from said intermediate device;
   causing a second communication session to be created wherein the second communication session involves textual communication;
   causing said second device to be connected to said destination device via said second communication session;
   causing said first communication session information to be associated with said second communication session;
   causing said second communication session to be terminated without disconnecting said second device of said customer from said destination device;
   when a third device of a second agent becomes available for connection to said second device, causing a third communication session to be created wherein the third communication session involves textual communication; and
   causing said second device and said third device to be connected via said third communication session wherein: prior to said step of causing a second communication session to be created, said method further comprises the steps of: causing a determination as to whether a transfer request is authorized; when said request is authorized, causing a list of allowed communication sessions to be determined; causing said list of allowed communication sessions and an authorization code to be provided to said first device, receiving a selection of an allowed communication session for said second communication session, and causing a destination address and an identification code of said third device for said second communications session to be sent to said second device; and causing a login of said second device at said destination address using said identification code of said third device.

9. The method of claim 8 wherein said step of causing said second device and said third device to be connected via said third communication session comprises causing an instruction to be created which causes said second device to request to be connected to said third communication session, connecting said third device to said third communication session, and connecting said second device to said second communication session.

10. A method of transferring a communication between a first device of a agent and a second device of a customer, said method comprising the steps of:
    establishing a first textual communication session between the first device and the second device;
    receiving a request from the first device of the agent to transfer said second device to a second communication session wherein the second communication session involves textual communication;
    causing a second communication session to be created; and
    causing a connection of said second device to said second communication session to be accepted wherein: prior to said step of causing a second communication session to be created, said method further comprises the steps of: causing a determination as to whether said request is authorized; when said request is authorized, causing a list of allowed communication sessions to be determined; causing said list of allowed communication sessions and an authorization code to be provided to said first device, receiving a selection of an allowed communication session for said second communication session, and causing first communication session information to be accepted; and after said step of causing a second communication session to be created, said method further comprises the steps of: causing a transfer page for said second communication session to be created, causing said transfer page to be sent to said second device, and wherein said step of causing a connection of said second device to said second communication session to be accepted comprises causing a connection of said second device to said transfer page to be accepted.

11. A method of facilitating a transfer of a communication between a first device of an agent and said second device of a customer, said method comprising the steps of:
    establishing a first textual communication session between the first device and the second device;

causing a list of allowed destinations to be provided to said first device of said agent;

receiving a selection of a destination from said first device;

causing a request for transfer of said first device and first communication session information to be sent to said destination;

causing a list of allowed communication sessions of said destination to be provided to said first device;

receiving a selected communication session from said list of allowed communications sessions from said first device;

causing first session communication information to be provided to said destination;

causing a second communication session to be created at said destination wherein the second communication session involves textual communication; and causing a destination address and an identification code for said second communications session to be sent to said second device; and causing a log-in of said second device at said destination address using said identification code.

* * * * *